(12) United States Patent
Pastro

(10) Patent No.: US 9,282,125 B2
(45) Date of Patent: Mar. 8, 2016

(54) APPARATUS AND METHOD FOR COMMUNICATIONS INVOLVING A LEGACY DEVICE

(71) Applicant: Rodrigo Pastro, Lake Worth, FL (US)

(72) Inventor: Rodrigo Pastro, Lake Worth, FL (US)

(73) Assignee: Unify GmbH & Co. KG, Munich (DE)

( * ) Notice: Subject to any disclaimer, the term of this patent is extended or adjusted under 35 U.S.C. 154(b) by 200 days.

(21) Appl. No.: 13/954,049

(22) Filed: Jul. 30, 2013

(65) Prior Publication Data

US 2015/0036690 A1 Feb. 5, 2015

(51) Int. Cl.
*H04L 29/06* (2006.01)
*H04L 29/08* (2006.01)

(52) U.S. Cl.
CPC .......... *H04L 65/1069* (2013.01); *H04L 65/102* (2013.01); *H04L 65/1003* (2013.01); *H04L 67/02* (2013.01); *H04L 65/104* (2013.01); *H04L 65/1023* (2013.01)

(58) Field of Classification Search
USPC .......... 370/352, 401; 709/228, 230, 227, 203, 709/202; 379/265.09
See application file for complete search history.

(56) References Cited

U.S. PATENT DOCUMENTS

| | | | |
|---|---|---|---|
| 2010/0293297 A1* | 11/2010 | Perumal et al. ................ | 709/245 |
| 2011/0196975 A1* | 8/2011 | Horvath et al. ................ | 709/228 |
| 2013/0185440 A1* | 7/2013 | Blau et al. ..................... | 709/227 |
| 2014/0095724 A1* | 4/2014 | Yoakum et al. ................ | 709/228 |
| 2014/0126714 A1* | 5/2014 | Sayko ....................... | 379/265.09 |
| 2014/0341366 A1* | 11/2014 | Phelps et al. ............. | 379/265.09 |
| 2015/0006610 A1* | 1/2015 | Johnston et al. .............. | 709/202 |

OTHER PUBLICATIONS

Amirante et al. , "On the seamless interaction between webRTC browsers and SIP-based conferencing systems", Communications Magazine, IEEE (vol. 51, Issue: 4), Apr. 2013, pp. 42-47.*
Trickle ICE: Incremental Provisioning of Candidates for the Interactive Connectivity Establishment (ICE) Protocol; E. Ivov, E.K. Rescorla, J. Uberti; Mar. 11, 2013; http://tools.ietf.org/html/draft-ivov-mmusic-trickle-ice-01.

(Continued)

*Primary Examiner* — Habte Mered
*Assistant Examiner* — Rownak Islam
(74) *Attorney, Agent, or Firm* — Buchanan Ingersoll & Rooney PC

(57) ABSTRACT

A gateway receives a message from a first terminal to establish a connection between the first terminal and a second terminal. The gateway sends a second message to the second terminal to offer a connection. After receiving the first message from the first terminal, the gateway receives subsequent third messages from the first terminal that identify candidates for assisting in the formation of the connection. The gateway saves information about these candidates. The gateway either uses such information for facilitating the formation of the connection or forwards that information to the second communication terminal after receiving an answer accepting the establishment of a connection from the second terminal and determining whether the second terminal has a Web Real-Time Communications ("WebRTC") client.

20 Claims, 8 Drawing Sheets

(56) References Cited

OTHER PUBLICATIONS

Trickle ICE: Incremental Provisioning of Candidates for the Interactive Connectivity Establishment (ICE) Protocol; E.K. Rescorla, J. Uberti; E. Ivov; Oct. 23, 2012; http://tools.ietf.org/html/draft-rescorla-mmusic-ice-trickle-01.

Trickle ICE: Incremental Provisioning of Candidate for the Interactive Connectivity Establishment (ICE) Protocol; E. Ivov, E.K. Rescorla, J. Uberti; Jan. 28, 2013; http://tools.ietf.org/html/draft-ivov-mmusic-trickle-ice-00.

Iana Registry for Interactive Connectivity Establishment (ICE) Options; M. Westerlund, C. Perkins; Jul. 2011; http://tools.ietf.org/html/rfc6336.

Interactive Connectivity Establishment (ICE): A Protocol for Network Address Translator (NAT) Traversal for Offer/Answer Protocols; J. Rosenberg; Apr. 2010; http://tools.ietf.org/html/rfc5245.

SIP: Session Initiation Protocol; J. Rosenberg, H. Schulzrinne, G. Camarillo, A. Johnston, J. Peterson, R. Sparks, M. Handley, E. Schooler; Jun. 2002; http://www.ietf.org/rfc/rfc3261.txt.

\* cited by examiner

First terminal having a WebRTC client initiates a call to a second terminal by sending a first message toward the second terminal via a first gateway. The first message is sent prior to the first terminal collecting ICE candidates. The ICE candidates may be subsequently communicated to a first gateway after sending of the first message.

↓

First gateway receives the first message from first terminal to initiate call, modifies content of the message and sends that modified information toward the second terminal in a second message.

↓

The second terminal answers the call.

↓

The first gateway receives the answer and determines whether the second terminal has WebRTC functionality or is not WebRTC functional.

↙ ↘

If the second terminal is a legacy device or otherwise does not have WebRTC functionality, the first gateway does not forward any ICE candidate the first terminal identified to the first gateway and facilitates the establishment of the connection between the first and second terminals. The first gateway may be responsible for RTP or STUN Interworking to establish the connection between the first and second terminals.

If the second terminal has WebRTC functionality, the first gateway sending the answer of the call to the first terminal and sending a message to at least one of a server and a second gateway that identifies all the ICE candidates the first terminal identified to the first gateway.

↓

A second gateway associated with the second terminal receiving a message identifying the ICE candidates identified by the first terminal and sending those candidates to the second terminal. The second gateway also sending ICE candidates it received from the second terminal to the server and the first gateway.

The first gateway sending the second terminal identified ICE candidates to the first terminal. ←

↓

A direct connection between the first and second terminal is established.

FIGURE 4

APPARATUS AND METHOD FOR COMMUNICATIONS INVOLVING A LEGACY DEVICE

FIELD OF INVENTION

The present invention relates to communication systems, networks, and methods of using the same. In one embodiment of the invention, a gateway is provided that is configured to support the connection of a first device to a legacy device for a communication session as well as supporting the connection to other non-legacy devices. A communication system, a network, a non-transitory computer readable medium that contains an application that can be executed by a gateway so the gateway performs a method and a method of using such apparatuses are also disclosed herein.

BACKGROUND OF THE INVENTION

The Interactive Connectivity Establishment Protocol ("ICE") includes an extension that is known as "Trickle Ice". The Trickle Ice extension is discussed in the Oct. 10, 2012 network working group draft memo entitled "Trickle Ice: Incremental Provisioning of Candidates for the Interactive Connectivity Establishment (ICE) Protocol". Subsequent versions of this memo are dated Jan. 28, 2013 and Mar. 11, 2013. These memos were published on the internet by the internet engineering task force ("IETF"). The entirety of all three of these memos is incorporated by reference herein.

ICE protocol has been described in RFC 6336, which is entitled "IANA Registry for Interactive Connectivity Establishment (ICE) Options and was published by the IETF on July 2011 and RCF 5245, which is entitled Interactive Connectivity Establishment (ICE): A Protocol for Network Address Translator (NAT) Traversal for Offer/Answer Protocols and was published by IETF in April of 2010. The entirety of RFC 6336 and RFC 5245 is incorporated by reference herein.

The Trickle Ice extension is configured to permit an ICE agent to send and receive candidates incrementally rather than exchanging complete lists so that ICE agents can begin connectivity checks while they are still gathering candidates so that an ICE agent is able to exchange host candidates as soon as a session has been initiated.

But, the use of Trickle Ice to permit improved connectivity can create different issues for communication networks. For instance, legacy devices that may function in accordance with Session Initiation Protocol ("SIP") may be unable to be utilized or may cause unforeseen delays or connectivity problems for more modern devices that support use of the Trickle Ice extension. Such issues pose cost constraints and reliability constraints on communication systems and could prevent use of the Trickle Ice extension as an economically feasible solution for some communication systems. I have determined that a new method and apparatus is needed to address such issues to permit networks to use legacy devices in such a manner that communication sessions may be more quickly established.

SUMMARY OF THE INVENTION

A method is provided for establishing a connection between a first communication terminal and a second communication terminal. The connection may be a direct media connection, a media connection anchored in a TURN server, or a media connection or other type of data connection that is established between the first and second terminals via at least one gateway. The first communication terminal may have a Web Real-Time Communication ("WebRTC") client. The method includes the steps of the first communication terminal sending a first message for establishing the connection with the second communication terminal, a first gateway receiving the first message, the first gateway modifying information included within the first message in response to receiving the first message and sending a second message that has the modified information toward the second communication terminal, and after sending the first message to the first gateway, the first communication terminal sending at least one third message to the first gateway identifying at least one first Interactive Connectivity Establishment Protocol ("ICE") candidate for facilitating formation of the connection between the first and second communication terminals sought to be established by the first communication terminal sending the first message. The method may also include the steps of the second communication terminal receiving the second message from the first gateway, the second communication terminal answering the second message by sending a fourth message to the first communication terminal to accept the establishing of the connection, the first gateway receiving the fourth message, and, in response to receiving the fourth message, the first gateway determining whether the second communication terminal has a WebRTC client based on the received fourth message. Upon a determination that the second communication terminal does not have a WebRTC client, the first gateway facilitates the establishment of the connection without forwarding the at least one first ICE candidate identified by the first communication terminal in the at least one third message. Upon a determination that the second communication terminal has a WebRTC client, the first gateway sends the fourth message to the first communication terminal and sends a fifth message to identify the at least one first ICE candidate that the first communication terminal identified to the first gateway in the at least one third message such that the second communication terminal receives information identifying the at least one first ICE candidate.

Embodiments of the method may also include additional steps. For instance, a second gateway may receive the fifth message and forward information about the at least one first ICE candidate identified in the fifth message to the second communication terminal and the second gateway can receive at least one sixth message from the second communication terminal after the second communication terminal sends the fourth message that identifies at least one second ICE candidate for facilitating formation of the connection between the first and second communication terminals. In response to receiving the fifth message, the second gateway may send a seventh message identifying the at least one second ICE candidate identified in the at least one sixth message such that the first gateway receives the seventh message. In response to receiving the seventh message, the first gateway can send information about the at least one second ICE candidate identified in the seventh message to the first communication terminal.

It should be understood that the first communication terminal may be a telephone device such as a cellular phone, a smart phone, an IP phone, or other type of telephone device, a laptop computer, a tablet, a computer, or an internet appliance and the second communication terminal may be a telephone device, a laptop computer, a tablet, a computer, or an internet appliance. The first gateway may be a computer device configured to support connection services provided for the first communication terminal. A second gateways may be present in embodiments of the system and may also be a computer device configured to support connection services provided for the second communication terminal. In some embodiments, one or more servers may also be present as computer devices that may help facilitate connection services offered to the first communication terminal, second communication terminal, or both communication terminals.

Embodiments of the method may also include the first gateway saving information about the at least one first ICE candidate identified via the at least one third message and the first gateway interworking to establish the connection, the connection being a media connection. Such an established connection may include the first gateway being connected to the first communication terminal either directly or via a Traversal Using Relays around Network Address Translators ("TURN") server and also being connected to the second communication terminal either directly or via a TURN server for establishing the connection and maintaining the connection formed between the first and second communication terminals.

In some embodiments of the method, the first message may be comprised of an Offer in accordance with Session Description Protocol ("SDP") and the fourth message may be comprised of an Answer in accordance with SDP. The second message may be formed in accordance with Session Initiation Protocol ("SIP") and may be an SIP INVITE message and the fourth message is an SIP 200 OK message. In embodiments having fifth or seventh messages, each of the fifth and seventh messages may be formed in accordance with SIP as an SIP INFO or an SIP PUBLISH message.

In some embodiments of the method, the second communication terminal has a WebRTC client and the connection that is established between the first and second communication terminals is a direct media connection or a connection anchored in a TURN server.

A communication system is also provided. The communication system may be part of a wide area network, a local area network, or a private network in some embodiments of the system. Embodiments of the communication system may include a first communication terminal, a first gateway communicatively connected to the first communication terminal, and a second communication terminal. The first communication terminal may end a first message for establishing a connection with the second communication terminal. The first gateway can receive the first message and, in response to receiving the first message, the first gateway may modify information included within the first message and send a second message having the modified information toward the second communication terminal. After sending the first message to the first gateway, the first communication terminal may send at least one third message to the first gateway identifying at least one first Interactive Connectivity Establishment Protocol ("ICE") candidate for facilitating formation of the connection between the first and second communication terminals sought to be established by the first communication terminal sending the first message. The second communication terminal may receive the second message from the first gateway, the second communication terminal can answer the second message by sending a fourth message to the first communication terminal to accept the establishing of the connection. The first gateway may receive the fourth message. In response to receiving the fourth message, the first gateway can determine whether the second communication terminal has a WebRTC client based on the received fourth message. Upon a determination that the second communication terminal does not have a WebRTC client, the first gateway facilitates the establishment of the connection without forwarding the at least one first ICE candidate identified by the first communication terminal. Upon a determination that the second communication terminal has a WebRTC client, the first gateway sends the fourth message to the first communication terminal and sends a fifth message to identify the at least one first ICE candidate that the first communication terminal identified to the first gateway in the at least one third message such that the second communication terminal receives information about the at least one first ICE candidate.

Embodiments of the system may also include a second gateway. The second gateway may be communicatively connected to the second communication terminal. The second gateway receives the fifth message and forwards information about the at least one first ICE candidate identified in the fifth message to the second communication terminal. The second gateway receives at least one sixth message from the second communication terminal after the second communication terminal sends the fourth message that identifies at least one second ICE candidate for facilitating formation of the connection between the first and second communication terminals. In response to receiving the fifth message, the second gateway sends a seventh message identifying the at least one second ICE candidate identified in the at least one sixth message such that the first gateway receives the seventh message and, in response to receiving the seventh message, the first gateway sends information about the at least one second ICE candidate identified in the seventh message to the first communication terminal.

In some embodiments of the system, the first gateway may save information about the at least one first ICE candidate identified via the at least one third message and the first gateway may utilize the saved information about the at least one first ICE candidate for interworking to establish the connection. Such a connection may be a direct media connection.

It should be appreciated that the first message may be comprised of an Offer in accordance with SDP and the fourth message may be comprised of an Answer in accordance with SDP. The second message may be formed in accordance with SIP and be an SIP INVITE message and the fourth message can be an SIP 200 OK message.

In some embodiments of the system, the first communication terminal and first gateway may be within a first local area network and the second communication terminal may be in a second local area network and the system may also include a second gateway in the second local area network communicatively connected to the second communication terminal. At least one server may also be provided in embodiments of the system to route messages between the first and second gateways.

The first gateway may save information about the at least one first ICE candidate identified via the at least one third message and the first gateway can utilize the saved information about the at least one first ICE candidate for interworking to establish the connection, the connection being anchored in a TURN server.

A non-transitory computer readable medium having an application stored thereon is also provided. The application has instructions that define a method performed by a gateway when the application is executed by the gateway. The method can include the step of the gateway receiving a first message from a first communication terminal for establishing a connection between the first communication terminal and a second communication terminal. In response to receiving the first message, the gateway may modify information included within the first message and send a second message having the modified information toward the second communication terminal. After receiving the first message, the gateway may also receive at least one third message from the first communication terminal identifying at least one first Interactive Connectivity Establishment Protocol ("ICE") candidate for facilitating formation of the connection between the first and second communication terminals sought to be established by the first communication terminal sending the first message. The gateway can receive a fourth message from the second terminal that answers the second message and accepts the establishing of the connection. In response to receiving the fourth message, the first gateway may determine whether the second communication terminal has a WebRTC client based on the received fourth message. Upon a determination that the second communication terminal does not have a WebRTC client, the gateway facilitates the establishment of the connection without forwarding the at least one first ICE candidate identified by the first communication terminal. Upon a determination that the second communication terminal has a WebRTC client, the gateway sends the fourth message to the first communication terminal and sends a fifth message to identify the at least one first ICE candidate that the first communication terminal identified to the gateway in the at least one third message such that the second communication terminal receives the identification of the at least one first ICE candidate.

The method defined by the application may also include the steps of the gateway saving information about the at least one first ICE candidate identified via the at least one third message and the first gateway referencing information about the at least one first ICE candidate identified in the at least one third message for setting up the connection upon a determination that the second communication terminal does not have a WebRTC client. The method may also include the gateway receiving a sixth message having information about at least one second ICE candidate identified by the second communication terminal and the gateway sending information about the at least one second ICE candidate identified in the sixth message to the first communication terminal.

Other details, objects, and advantages of the invention will become apparent as the following description of certain present preferred embodiments thereof and certain present preferred methods of practicing the same proceeds.

BRIEF DESCRIPTION OF THE DRAWINGS

Exemplary embodiments of communication devices, systems, and apparatuses for providing communications between multiple communication devices are shown in the accompanying drawings and certain exemplary methods of practicing the same are also illustrated therein. It should be understood that like reference numbers used in the drawings may identify like components.

FIG. 4 is a flow chart of an exemplary embodiment of a method of establishing a communication connection.

DETAILED DESCRIPTION OF EXEMPLARY EMBODIMENTS

Figure 1:
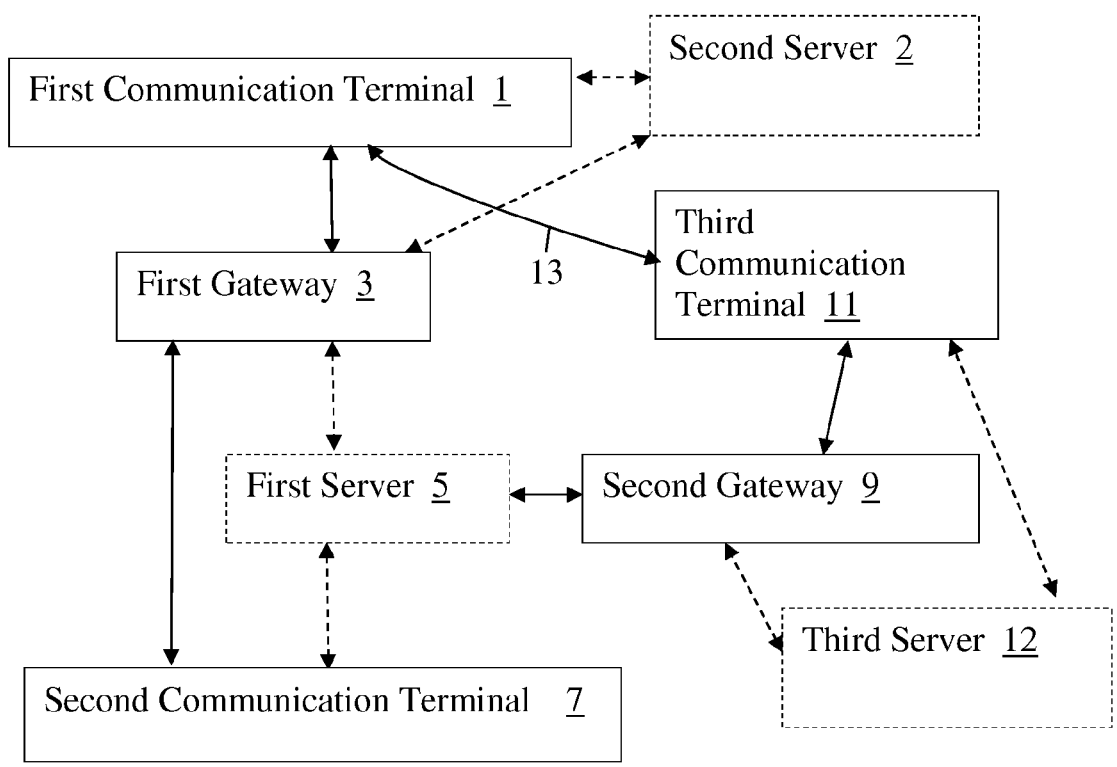
FIG. 1 is a block diagram of a first exemplary embodiment of a communication system. The first, second and third servers 5, 2 and 12 and the broken line arrows extending between these servers and other elements illustrate optional devices that may be provided within the system. It should be understood that additional other optional devices such as network nodes, base stations, and other elements of one or more networks may also be present within an embodiment of the system.

Referring to FIGS. 1-3 and 5-6, an exemplary embodiment of a communication system includes a plurality of communication terminals connected to a plurality of communication devices. The system may be a network that includes a plurality of subnetworks. In one embodiment, the system may include a wide area network that includes a plurality of interconnected local area networks. Gateways may interconnect the different local area networks in some embodiments of the system. The communication terminals may be connected to each other via a wireless connection or via a wired connection, or via a combination of wired and wireless connections. Intermediate nodes such as certain communication devices (e.g. gateways, servers, base stations, other network nodes) may be within the path of communication along which one communication terminal communicates with another communication terminal.

A first communication terminal 1 may be communicatively connected to a first gateway, and a first server 5. The first communication terminal 1 may also be communicatively connected to an optional second server 2, which is illustrated in broken line in FIG. 1. A second communication terminal may be connected to the first server 5. A third communication terminal 11 may be connected to a second gateway 9 and the first server 5. The third communication terminal 11 may also be connected to an optional third server 12, which is shown in broken line in FIG. 1. In some embodiments, the optional second and third servers may be ICE agents that help facilitate a communication connection between communication terminals that function as WebRTC clients configured to operate in accordance with ICE. In other embodiments, the second and third servers may be Traversal Using Relays around Network Address Translators ("TURN") servers or Simple Traversal of User Datagram Protocol Through Network Address Translators ("STUN") servers.

In one embodiment, the first and second communication terminals 1 and 7, the first server 5 and first gateway 3 may be within one local area network and the second gateway 9 and third communication terminal 11 may be within a separate local area network. In other embodiments, the first gateway 3 and first communication terminal 1 may be within one local area network, the first server 5 and second communication terminal 7 may be in a second local area network, and the third communication terminal 11 and second gateway 9 may be in a third local area network. The separate local area networks may be communicatively connected to each other by a border control device a gateway, or other node of the wide area network that encompasses the multiple local area networks. In certain embodiments, the wide area network may be a private network that is maintained by a business or governmental agency, or other entity.

The first, second, and third communication terminals 1, 7 and 11 may also each be connected to a respective Network Address Translators ("NAT") server (not shown). For example, in some embodiments a first NAT server may communicate with the first communication terminal 1 to help the first communication terminal 1 safely communicate with the first gateway 3 or first server 5 or communication terminals that may be external to the local area network of the first communication terminal 1. A second NAT server may communicate with the second communication terminal 7 to permit the second communication terminal 7 to safely communicate with the first terminal 1 or third terminal 11. A third NAT server may communicate with the third communication terminal 11 to help the third communication terminal 11 safely communication with the third server 12, second gateway 9, first server 5, first gateway 3, first communication terminal 1 or second communication terminal 7.

It should be understood that the first and third communication terminals 1 and 11 may each have a WebRTC client that enables a web browser of the terminal with Real-Time Communications (RTC) capabilities via at least one simple JavaScript application programming interface ("API"). The Google Chrome web browser offered by Google, Inc. is an example of a WebRTC enabled browser that may be a function or client of the first 1 and third 11 communication terminals. The second communication terminal 7 may be a legacy device, such as an SIP legacy device that is configured to operate in accordance with SIP and does not have a WebRTC client stored thereon or usable thereon. It should be understood that SIP is discussed in RFC 3261, which is entitled SIP: Session initiation Protocol and was published in June of 2002 by the IETF. The entirety of RFC 3261 is incorporated by reference herein.

Figure 2:
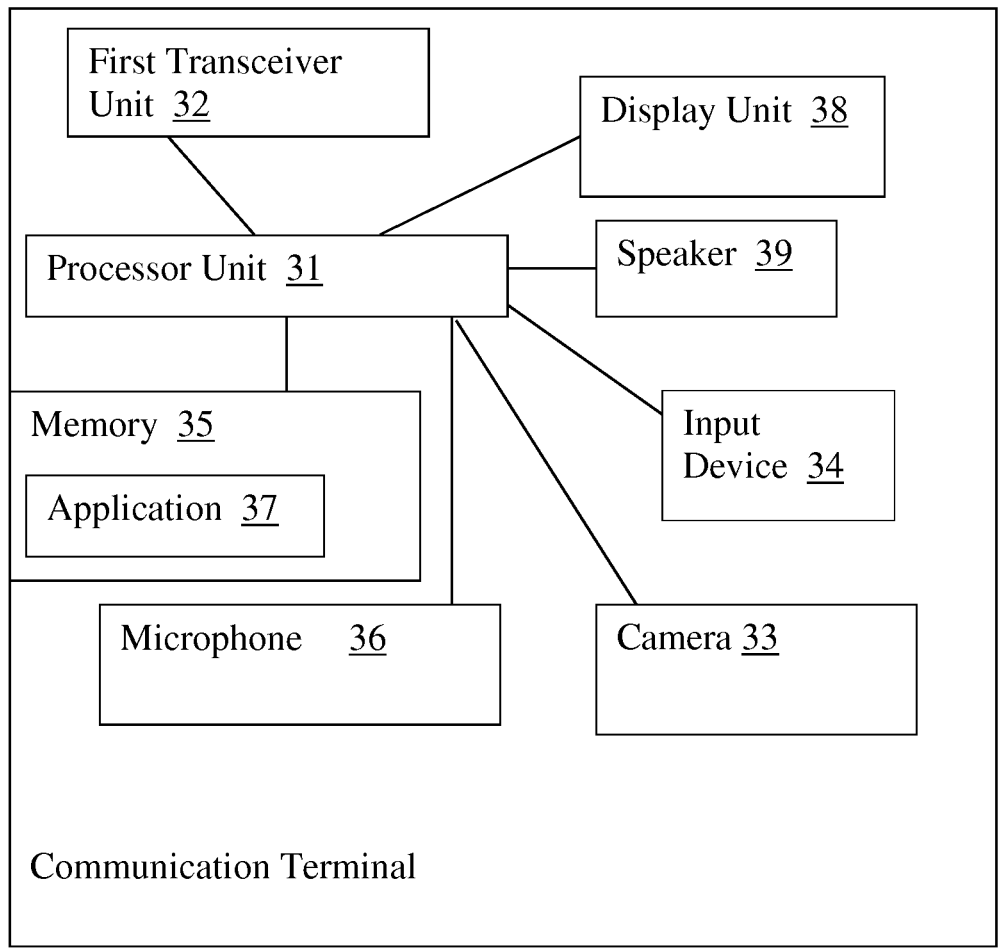
FIG. 2 is a block diagram of an exemplary embodiment of a communication terminal. It should be understood that the first, second and third communication terminals 1, 7 and 11 shown in FIG. 1 may each be configured as an embodiment of the communication terminal illustrated in FIG. 2.

Referring to FIG. 2, each of the first, second, and third communication terminals 1, 7 and 11 may be a communication endpoint and have similar hardware elements. Each communication terminal may be a desktop computer, laptop computer, smart phone, computer tablet, internet appliance, cellular phone, or other type of communication endpoint device. For instance, each of the first, second and third communication terminals have the configuration for a communication terminal as shown in FIG. 2. Each communication terminal may include a processor unit 31 that is connected to non-transitory memory 35, a first transceiver unit 32, a display unit 38, at least one speaker 39, at least one microphone 36, a camera 33, and at least one input device 34. The memory 35 may have one or more applications 37 stored thereon. The display unit 38 may be a liquid crystal display, monitor, or touch screen display. The input device 34 may be a keyboard, a scanner, a reader, one or more buttons, a mouse, or other device that permits a user to provide input to the terminal for data storage in memory 35 or to instruct the processor unit 31 on how to run a particular application. The speaker 39 may emit audio and the microphone may record verbal audio input provided by a user. The camera 33 may be connected to the processor unit 33 for capturing photos or video for storage in the memory, display via the display unit 38, and transmission of the video or photos to third parties or other terminals or devices via the first transceiver unit 32. The first transceiver unit may include at least one receiver and at least one transmitter for receiving and transmitting data. In some embodiments, the communication terminal may include multiple transceivers, one for wireless communications via a first type of protocol, a second for wireless communications via a second type of protocol, and a third for a wired communication path via a universal serial bus ("USB") connection or other wired connection. The processor unit 31 may be a central processor, a microprocessor, multiple interconnected processors or other type of processing hardware element. The non-transitory memory may be a hard drive, flash memory, or other type of non-transitory computer readable medium that is readable and accessible by the processor unit 31. At least one application 37 may be stored on the memory that each defines instructions that the processor unit implements when executing the application so that the communication terminal performs a particular type of method as defined by the application. For instance, one application 37 may define a WebRTC client for the first and third communication terminals 1, 11, for example so that those terminals can establish communications in which audio, video, or both audio and video are sent to other terminals, received from other terminals, or both sent and received exchanged with other terminals via at least one connection established between those terminals. An application 37 of the second communication terminal may define a communication client that is not a WebRTC client to facilitate communications via audio, video or both audio and video to facilitate the sending of such data to other terminals, receiving such data from other terminals, or both sending and receiving such types of data with other terminals via at least one connection established between the terminals. The application 37 of the second communication terminal 7 may be configured for communications in accordance with secure real-time protocol ("SRTP"), datagram transport layer security ("DTLS") protocol, ICE protocol, STUN protocol, or TURN protocol.

Figure 3:
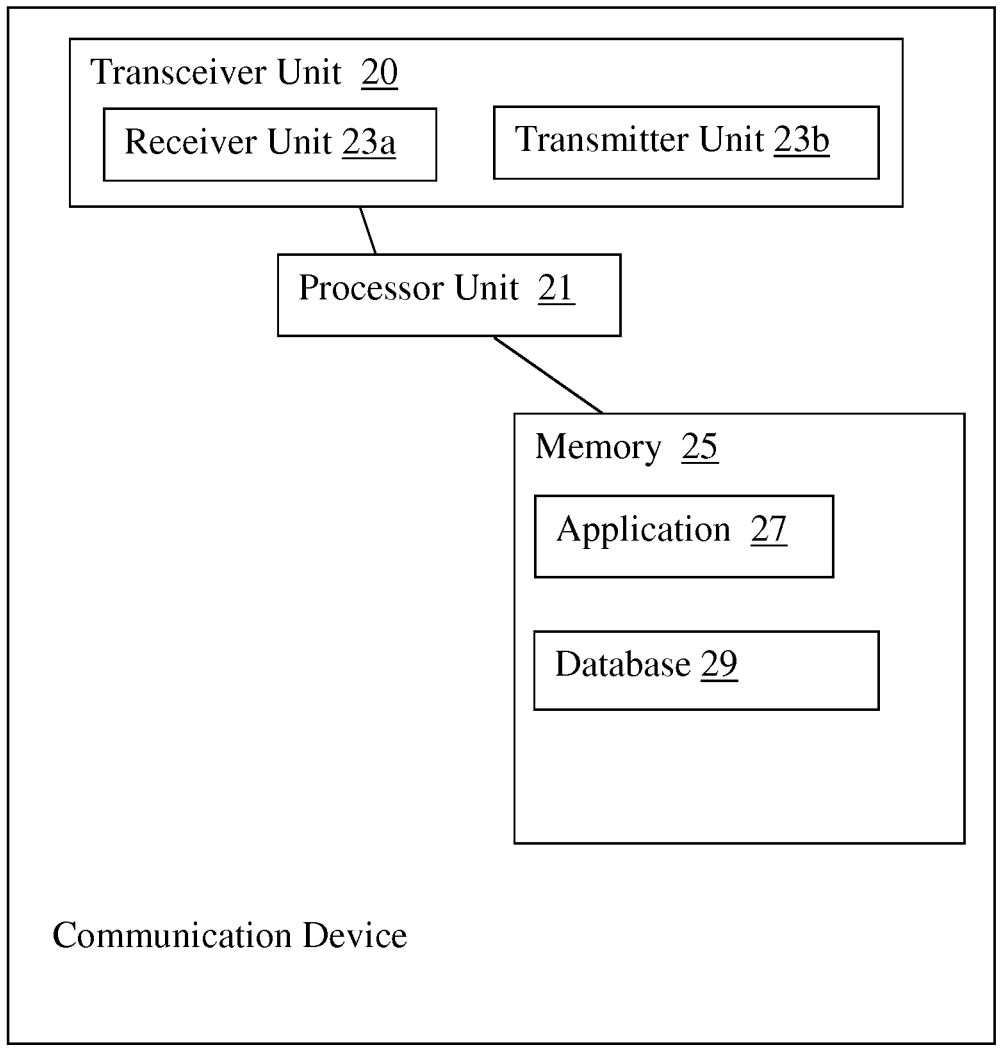
FIG. 3 is a block diagram of an exemplary embodiment of a communication device. It should be understood that the first and second gateways 3 and 9 and the first server 5, second server, 2 and third server 12 shown in the system of FIG. 1 may each be a communication device and may each be configured as an embodiment of the communication device shown in FIG. 3.
Figure 5:
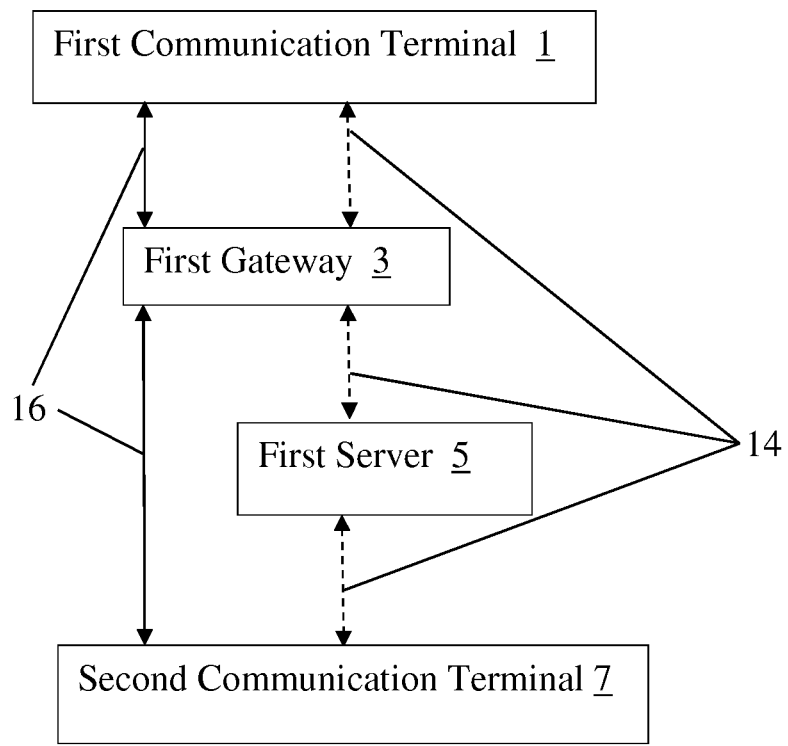
FIG. 5 is a block diagram illustrating a fragmentary view of the exemplary system shown in FIG. 1. For FIG. 5, the broken line arrows 14 illustrate signaling communication connections extending between first communication terminal 1 and second communication terminal 7 and solid line arrows 16 represent a media data connection formed between the first and second communication terminals 1 and 7.

Each of the first gateway 3, second gateway 9, first server 5, second server 2 and third server 12 may be a communication device such as a network node and may each have a configuration as shown in FIG. 3. For instance, each of these communication devices may include a transceiver unit 20 that is connected to a processor unit 21. The transceiver unit 20 may include at least one receiver unit 23a and at least one transmitter unit 23b by which the communication device may send and receive data from communication terminals and other communication devices (e.g. servers, gateways, base stations, network nodes, etc.) to which the device may be connected via wireless connections or wired connections. The transceiver unit 20 may support communications in accordance with SRTP, DTLS, ICE protocol, STUN protocol, TURN protocol and other communication protocols. Non-transitory memory 25 may also be connected to the processor unit 21.

The memory 25 may have at least one application 27 stored thereon and include one or more databases 29. Each application 27 may have instructions that define a method that is implemented by the communication device when the processor unit 21 runs the application 27. The processor unit may access the database 29 for data and execute the at least one application 27 such that the communication device provides one or more services to communication terminals that are communicatively connectable to the communication device. The processor unit may include a central processor, a central processing unit, a plurality of interconnected microprocessors, a plurality of interconnected processors, or other types of processors or processor elements.

Figure 7:
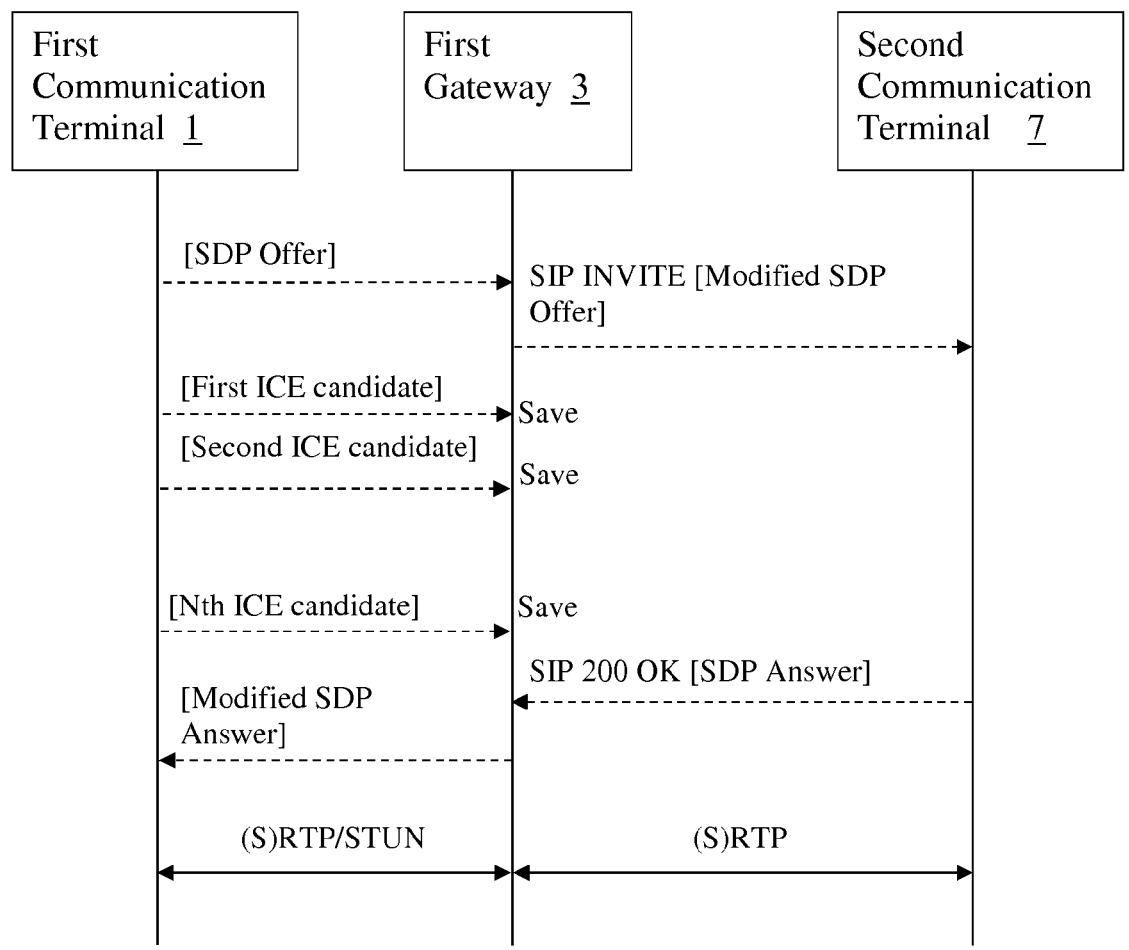
FIG. 7 is a flow chart illustrating how certain messages may be transmitted between the first communication terminal 1, first gateway 3, and second communication terminal 7 of the exemplary system shown in FIG. 1. It should be understood that "(S)RTP/STUN" refers to a connection formed in accordance with SRTP, RTP, or STUN and that "(S)RTP" refers to a connection formed in accordance with SRTP or RTP.

Embodiments of the system and embodiments of the terminals and communication devices may permit implementation of different methods, such as the method shown in FIG. 4. For instance, as may be appreciated from FIGS. 4-5 and 7, the first communication terminal 1 may attempt to establish a communication session with the second communication terminal 7. The communication session may be an audio based phone call in which audio data is transmitted and received by the terminals, audio data as well as other data (e.g. text data or other non-audio data) or a video call in which video data and audio data are transmitted and received by the terminals or a video call in which audio data, video data, as well as other types of data (e.g. text data, etc.) are exchanged between the first and second communication terminals 1 and 7. The first communication terminal 1 may initiate the call with the second communication terminal 7 and send a first message to the first gateway 3 in accordance with Session Description Protocol ("SDP") (e.g. may initiate a call and send an SDP Offer via the first message). The first message sent to the first gateway 3 may not identify any ICE agents, or ICE candidates, or may only identify at least one local candidate that is quickly ascertained by the first terminal such as a local IP address and port number in the first communication terminal 1.

The first gateway may have an application that is run by the first gateway so that the first gateway can implement a method that facilitates the method shown in FIG. 4. The first gateway 3 may respond to that first message by sending a second message to the second communication terminal 7. The second message may be sent as an SIP INVITE message and include a modified SDP Offer that identifies any ICE candidates for the communication session immediately known to the first gateway 3, which includes any ICE candidates identified in the first message received from the first communication terminal 1. The second message may also include information about the address and port of the first gateway that is allocated by the first gateway for interworking for the connection between the first and second communication terminals 1 and 7. In response to receipt of the first message, the first gateway 3 may also allocate local resources that may be needed to support interworking between the first and second communication terminals in the event the second communication terminal 7 is a legacy device that requires interworking support from the first gateway 3 to establish a data connection between the first and second terminals 1 and 7.

The first communication terminal 1 may send additional third messages to the first gateway 3 that identifies additional new ICE candidates (e.g. First ICE candidate, Second ICE candidate, an Nth ICE candidate) to the first gateway 3. In response to these one or more third messages, the first gateway 3 may save the identifications of these ICE candidates for future use, in the event they are needed for the establishment of the connection.

The second communication terminal 7 may receive the second message from the first gateway 3. In some embodiments, a first server 5 such as an SIP server may forward that second message to the second communication terminal 7 for that terminal to receive the message via a signaling connection represented via broken line arrows 14 shown in FIG. 5. In other embodiments, a gateway of the local area to which the second communication terminal 7 is positioned may receive that second message and forward it to the second communication terminal 7. In response to the received second message, the second communication terminal 7 may send a fourth message that accepts the connection along the signaling connection represented by arrows 14. The fourth message may be an SIP 200 OK response that includes an SDP Answer, for example. In some embodiments, the first gateway 3 may subsequently receive the fourth message via the first server 5 and verify that the second communication terminal 7 is an SIP legacy device. In other embodiments, the fourth message may be received by the first gateway 3 from the second communication terminal 7. Upon determining that the second communication terminal is an SIP legacy device that does not have a WebRTC client by which it is responding to the second message, the first gateway will know it is responsible for the SRTP/STUN interworking so it does not need to forward any of the saved ICE candidates received in the third messages sent by the first communication terminal. The first gateway 3 may then communicate with the first and second communication terminals 1 and 7, first server 5, and any other communication devices (e.g. STUN server, NAT server, TURN server) associated with the first and second communication terminals 1 and 7 to help establish the connection between the first and second communication terminals 1 and 7 to set up the call between the terminals. The first communication terminal 1 may continue sending third messages to the first gateway 3 that identify newly discovered ICE candidates until the connection is formed. But, the first gateway 3 may simply ignore or not save data relating to these messages if the first gateway has already identified a viable candidate for the SRTP communication with the first communication terminal for the data connection to be established between the first and second terminals 1 and 7 (represented by arrows 16 in FIG. 5). Alternatively or in addition to ignoring such information, the first gateway 3 may send a notice to the first communication terminal informing the terminal that it has already selected a viable candidate for establishing the connection between the first and second communication terminals 1 and 7 so that the first communication terminal 1 stops sending such messages to the first gateway 3.

Figure 6:
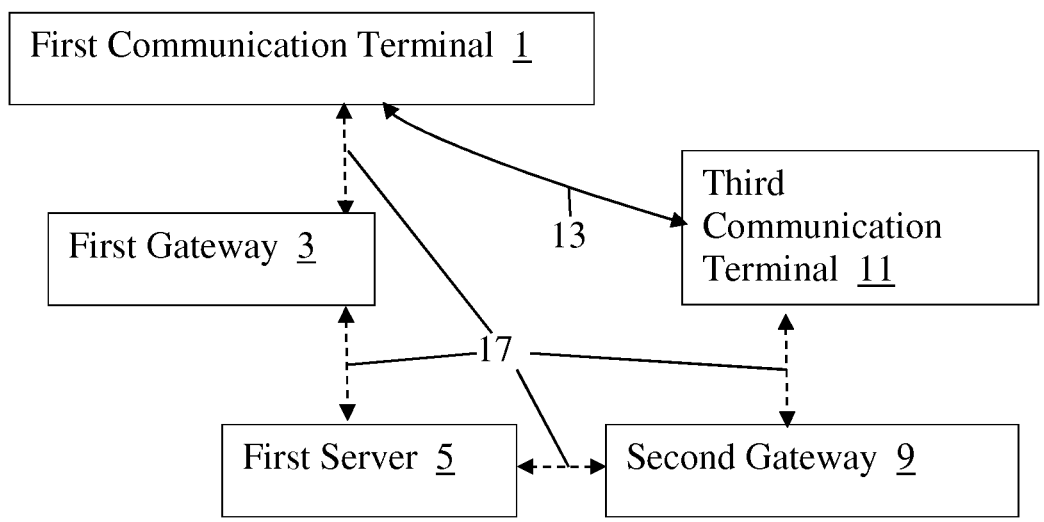
FIG. 6 is a block diagram illustrating a fragmentary view of the exemplary system shown in FIG. 1. For FIG. 6, the broken line arrows 17 illustrate a signaling communication connection extending between the first and third communication terminals 1 and 11 and the solid line arrow 13 represents a direct connection, the direct connection may be a media data connection or other type of data connection formed in accordance with real-time protocol ("RTP"), secure real-time protocol ("SRTP"), or Simple Traversal of User Datagram Protocol Through Network Address Translators ("STUN").
Figure 8:
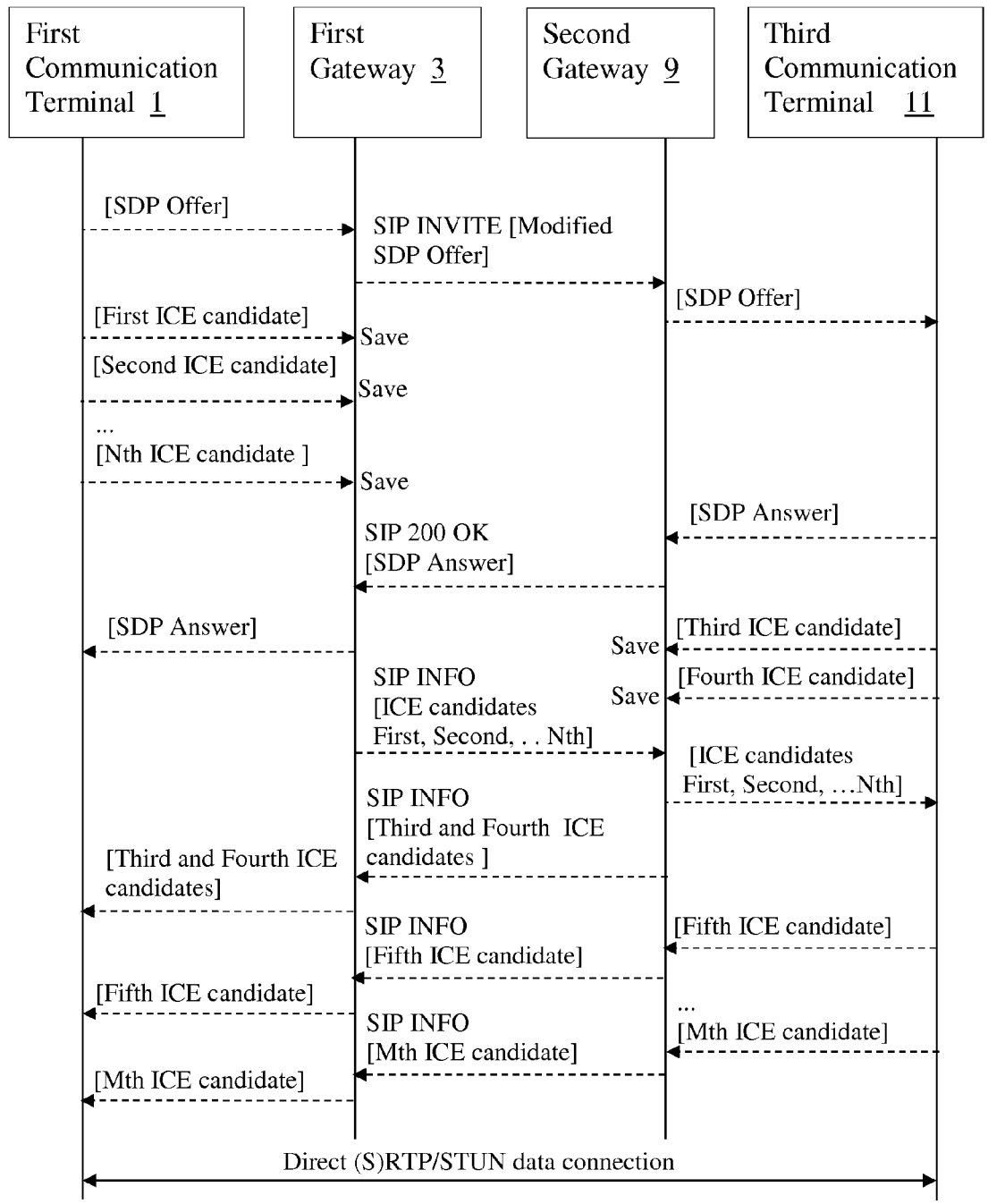
FIG. 8 is a flow chart illustrating how certain messages may be transmitted between the first communication terminal 1, first gateway 3, second gateway 9, and third communication terminal 11 of the exemplary system shown in FIG. 1. It should be understood that "(S)RTP/STUN data connection" refers to a data connection formed in accordance with SRTP, RTP, or STUN.

As may be appreciated from FIGS. 4, 6 and 8, the first communication terminal 1 may also attempt to form a connection to exchange audio data, video data, or both audio and video data with the third communication terminal 11. For instance, the first communication terminal may send a message seeking to establish a call or video call with the third communication terminal 11. To do this, the first communication terminal 1 may first send a first message to the first gateway 3 that includes an SDP Offer that does not identify any ICE candidates or only identifies one or more quickly known local ICE candidates such as an IP address and port number of the first communication terminal 1.

The first gateway 3 may receive this first message seeking to establish the call or video call with the third communication terminal and modify the SDP Offer within that message. The first gateway 3 may include the modified SDP Offer in a second message, which may be formatted as an SIP INVITE message, that the first gateway 3 sends toward the third communication terminal 11 in response to receiving the first message from the first terminal 1 that seeks to establish the communication connection with the third communication terminal 11.

While the communication connection is being established, the first communication terminal 1 may send third messages to the first gateway that identifies additional ICE candidates (e.g. a first ICE candidate, second ICE candidate, Nth ICE candidate, etc.) that the first communication terminal 1 identifies after having sent the first message to the first gateway 3 for initiating the communication connection with the third terminal. The first gateway 3 may receive these third messages and save information about the ICE candidates identified by the first communication terminal 1 in the first message and in any subsequently received third messages so such candidates may be quickly identified, forwarded to another device, or evaluated by the first gateway 3 if needed during the establishment of the communication connection.

The second gateway 9 may receive the SIP INVITE message from the first gateway 3 and identify that the message originated from the first communication terminal 1 and also identify that the first communication terminal has a WebRTC client. Such an identification may be made based on information included in the SIP INVITE message received by the second gateway 9, such as information provided within the modified SDP Offer component of the SIP INVITE message. Alternatively, the second gateway 9 may make such an identification based on other information received by the second gateway 9 in previously received communications.

In response to receiving the SIP INVITE message from the first gateway 3, the second gateway 9 may send the modified SDP Offer, or a modified version of that SDP Offer included within the received SIP INVITE message, to the third communication terminal 11. In response to the receipt of the SDP Offer from the second gateway 9, the third communication terminal 11 may accept the communication connection request and send a message toward the first communication terminal 1 that includes an SDP Answer. Such a message may be, for example, a SIP 200 OK message. This acceptance message may include no ICE candidates or may include only local ICE candidates that are very quickly identifiable by the third communication terminal, such as an IP address and port number of the third communication terminal 11.

The second gateway 9 may receive the answer from the third communication terminal 11. In response to the receipt of this answer, the second gateway 9 may forward the answer to the first gateway 3 for communicating the answer to the first communication terminal 1. Thereafter, the third communication terminal may identify additional ICE candidates or other new ICE candidates and send one or more subsequent messages to the second gateway 9 that identifies these newly identified ICE candidates (e.g. Third ICE candidate, Fourth ICE candidate, Fifth ICE candidate, Mth ICE candidate, etc.). The second gateway 9 may save the identification of these ICE candidates for future reference and use in case such information is needed for establishing the connection between the first and third communication terminals 1 and 11. For instance, the second gateway 9 may save such identified ICE candidates for sending information about the ICE candidates to the first gateway 3 so that the first gateway 3 can send this information to the first terminal 1 and the ICE candidates and STUN connectivity checks exchange can subsequently be performed between the first and third communication terminals 1 and 11 (e.g. the first and third communication terminals 1 and 11 perform these checks).

The first gateway 3 receives the answer and verifies that the communication was answered by the third communication terminal 11 and that this terminal has a WebRTC client so that it knows that the terminals may be connected directly between the first and third communication terminals 1 and 11 for exchange of media data such as video and audio data for a video call or audio data for a phone call. The SDP Answer within the acceptance is then forwarded by the first gateway 3 to the first communication terminal 1. The first gateway 3 also sends an SIP INFO message to the second gateway 9 that includes an identification of all the ICE candidates it has identified and saved, which includes any ICE candidates that the first communication terminal 1 identified to the first gateway 3 in the third messages it sent to the first gateway 3. It should be understood that the first server 5 may be an SIP server that may forward the SIP INFO message exchanged between the first and second gateways 3, 9. The ICE candidates may be identified within the body of the SIP INFO message that is sent to the server and may be encoded in any of a number of suitable formats, such as the Extensible Markup Language ("XML") format or JavaScript Object Notation ("JSON") format.

The second gateway 9 may subsequently receive the SIP INFO message sent by the first gateway 3. The SIP INFO message may be sent by the first gateway such that it is sent to both the server and the second gateway 9 or the SIP INFO message may be received by the server and the server may subsequently send a copy of that message to the second gateway (e.g. save the message and subsequently forward the message to the second gateway). The second gateway may identify the ICE candidates included within the SIP INFO message and subsequently send the identification of those candidates or other information about those ICE candidates to the third communication terminal 11. The second gateway 9 may also send the ICE candidates it has received from the third terminal to the server and to the first gateway 3. The ICE candidates identified to the server and first gateway may be within an SIP INFO message and may identify the ICE candidates the third communication terminal 11 identified to the second gateway 9 after the second gateway 9 received the answer to the initial messaging from the first communication terminal 1 forwarded by the first gateway 3 seeking a connection to be formed between the first and third communication terminals 1 and 11. As with the SIP INFO message sent by the first gateway 3, the SIP INFO message sent by the second gateway 9 may identify the ICE candidates in the body of the message in a suitable format such as XML format or JSON format.

The first gateway 3 may receive the SIP INFO message sent by the second gateway 9 either via the second gateway 9 or via the first server 5 and may thereafter send the identification of the ICE candidates identified by the second gateway 9 to the first communication terminal 1. For some embodiments, the first server 5 may be an SIP server that forwards the SIP INFO message sent by the second gateway 9 to the first gateway 3 so that the first gateway 3 receives the SIP INFO message, for example.

It should be understood that the first and third communication terminals may each continue sending ICE candidates to their respective gateways (e.g. the first or second gateways 3, 9) after the third communication terminal sends the SDP Answer and after the first communication terminal 1 receives the SDP Answer sent by the third communication terminal 11. Thereafter, the server and any identified and selected ICE candidate from the listing of identified ICE candidates identified in the SIP INFO messages sent by the first and second gateways 3, 9 facilitates the establishment of a direct connection represented by arrow 13 between the first and third communication terminals 1 and 11 so that the first and third communication terminals 1 and 11 establish a direct media connection (e.g. an SRTP connection) and exchange media data such as audio data, video data, both audio data and video data, or other data. Such an exchange of media data may be for a phone call, or video call, for example. The transmission of video content, audio content, both video and audio content as well as other data may be from the first communication terminal 1 to the third communication terminal 11 and may also include such data being transmitted by the third communication terminal 11 to the first communication terminal 1. The direct media connection represented by arrow 13 that is established between the first and third communication terminals 1 and 11 may exist in addition to the communication connection formed via the various intermediate nodes of the wide area network that can include the first and second gateways 3, 9. For instance, the direct media connection may not affect any signaling connection formed between the terminals and various intermediate nodes, which can include the first server 5 and first and second gateways 3 and 9 (e.g. the signaling connection illustrated via arrows 17 in FIG. 6). The direct media connection may be a wireless connection that does not include any intermediate nodes or intervening devices that intercept, receive, or forward any media data between the first and third communication terminals 1 and 11.

In some embodiments, a direct media connection may not be formable between the first and third communication terminals 1 and 11 due to the organization or structure of the communication system. For instance, a direct media connection may not formable between the first and third communication terminals 1 and 11 because those terminals are behind NATs. For such embodiments, the media connection may be anchored in a TURN server. Such a TURN server may be the second server 2 or third server 12 shown in FIG. 1, for example. Such a formation of this connection can be negotiated via the STUN connectivity checks between the ICE candidates offered by the first and third communication terminals that occur during the establishment of the media connection.

It should also be appreciated that by the first communication terminal 1 sending an SDP Offer within a message seeking to initiate a connection with the third communication terminal or second communication terminal without having to wait to identify all available ICE candidates, the sending of the message seeking to initiate establishment of the connection occurs more quickly. Additionally, the response to this SDP Offer by the third communication terminal 11 occurs much more quickly as it also does not have to wait for identifying all available ICE candidates prior to sending an answer responding to the offer. This reduces delays in establishing a direct connection between the first and third communication terminals 1, 11 and also reduces delays in establishing a communication connection between the first communication terminal 1 and the second communication terminal 7. It also prevents delays that could arise when a connection is sought with a legacy device that does not support ICE and the identification of such ICE candidates is not needed for any establishment of a connection so that unnecessary delays and bandwidth usage is prevented. Embodiments of the system also can permit a quick, direct media connection between terminals that have WebRTC clients while also permitting legacy devices to connect to such terminals without breaking any direct connectivity that may exist or be viable with terminals having WebRTC clients or other clients that may support Trickle ICE.

It should be appreciated that many different types of variations to the above discussed embodiments of the non-transitory computer readable medium having an application stored thereon that is executable by a gateway, communication terminals, communication devices, communication systems, and method of making and using the same may be made. For instance, the communication terminals may each be a laptop, tablet, or other type of mobile communication endpoint device that is able to communicate with other devices via at least one network connection, such as an internet connection, enterprise network connection, or cellular network connection. As another example, the speaker, display, microphone, detector, memory, transceiver, camera sensor and processor unit of different devices may all be within one housing or may be separate components that are communicatively coupled to each other. For instance, the speaker, microphone, detector and display unit may be in one structure such as a handset or wirelessly connected monitor device while the processor unit, transceiver, and memory may be positioned in one or more other separate structures such as a computer housing or mobile phone housing or tablet housing. As yet another example, one or more periphery devices may be connected to the communication terminal such as a keyboard or other input device or a headset or other output device. Such devices may be wirelessly coupled or coupled via a wired connection via one or more peripheral device interfaces. The communication terminals may be connectable to each other and to a gateway, server, or other type of network node or communication device via a wireless communication connection traversing one or more networks and multiple different intermediate nodes. Such a wireless connection may include certain path segments that are interconnected via a cable or other direct communication connection between intermediate nodes of the communication path. In yet other embodiments, the communication path between communication terminals may always traverse over a wired or physical communication path and may not include any wireless communication path components. As another example of alternative designs, it should be understood that the first and second gateways and first, second, and third servers may each be a type of communication device such as a network node or a computer device that hosts a service available to endpoints such as communication terminals.

While certain present preferred embodiments of a communication terminal, non-transitory computer readable medium executable by a communication terminal, a communication system, and methods of making and using the same have been shown and described above, it is to be distinctly understood that the invention is not limited thereto but may be otherwise variously embodied and practiced within the scope of the following claims.

What is claimed is:

1. A method of establishing a connection between a first communication terminal and a second communication terminal, the first communication terminal having a Web Real-Time Communications ("WebRTC") client, the method comprising:

the first communication terminal sending a first message for establishing the connection with the second communication terminal;

a first gateway receiving the first message;

in response to receiving the first message, the first gateway modifying information* included within the first message and sending a second message that has the modified information toward the second communication terminal;

after sending the first message to the first gateway, the first communication terminal sending at least one third message to the first gateway identifying at least one first Interactive Connectivity Establishment Protocol ("ICE") candidate for facilitating formation of the connection between the first and second communication terminals sought to be established by the first communication terminal sending the first message;

the second communication terminal receiving the second message from the first gateway;

the second communication terminal answering the second message by sending a fourth message to the first communication terminal to accept the establishing of the connection;

the first gateway receiving the fourth message;

in response to receiving the fourth message, the first gateway determining whether the second communication terminal has a WebRTC client based on the received fourth message;

upon a determination that the second communication terminal does not have a WebRTC client, the first gateway facilitating the establishment of the connection without forwarding the at least one first ICE candidate identified by the first communication terminal in the at least one third message; and upon a determination that the second communication terminal has a WebRTC client, the first gateway sending the fourth message to the first communication terminal and sending a fifth message to identify the at least one first ICE candidate that the first communication terminal identified to the first gateway in the at least one third message such that the second communication terminal receives information identifying the at least one first ICE candidate.

2. The method of claim 1 further comprising:
a second gateway receiving the fifth message and forwarding information about the at least one first ICE candidate identified in the fifth message to the second communication terminal;

the second gateway receiving at least one sixth message from the second communication terminal after the second communication terminal sends the fourth message, each sixth message identifying at least one second ICE candidate for facilitating formation of the connection between the first and second communication terminals;

in response to receiving each sixth message, the second gateway sending a seventh message identifying the at least one second ICE candidate identified in that sixth message such that the first gateway receives the seventh message; and in response to receiving the seventh message, the first gateway sending information about the at least one second ICE candidate identified in the seventh message to the first communication terminal.

3. The method of claim 2 wherein the first communication terminal is a telephone device, a laptop computer, a tablet, a computer, or an internet appliance and the second communication terminal is a telephone device, a laptop computer, a tablet, a computer, or an internet appliance;

wherein the at least one sixth message is comprised of multiple sixth messages that each identify at least one second ICE candidate and;

wherein the at least one third message is comprised of multiple third messages that each identify at least one first ICE candidate.

4. The method of claim 2 further comprising the first gateway saving information about the at least one first ICE candidate identified via the at least one third message and the first gateway interworking to establish the connection, the connection being a media connection.

5. The method of claim 1 wherein the first message is comprised of an Offer in accordance with Session Description Protocol ("SDP") and the fourth message is comprised of an Answer in accordance with SDP.

6. The method of claim 5 wherein the second message is formed in accordance with Session Initiation Protocol ("SIP") and is an SIP INVITE message and wherein the fourth message is an SIP 200 OK message.

7. The method of claim 1 wherein the second communication terminal has a WebRTC client and wherein the connection established between the first and second communication terminals is a direct media connection or a connection anchored in a Traversal Using Relays around Network Address Translators ("TURN") server.

8. A communication system comprising:
a first communication terminal;
a first gateway communicatively connected to the first communication terminal;
the first communication terminal configured to send a first message for establishing a connection with a second communication terminal;
the first gateway configured to receive the first message;
the first gateway configured to modify information included within the first message and send a second message having the modified information toward the second communication terminal in response to receiving the first message;
the first communication terminal configured to send at least one third message to the first gateway after sending the first message to the first gateway, the third message identifying at least one first Interactive Connectivity Establishment Protocol ("ICE") candidate for facilitating formation of the connection between the first and second communication terminals sought to be established by the first communication terminal sending the first message;
the first gateway configured to receive a fourth message from the second communication terminal that accepts the establishing of the connection;
the first gateway configured to determine whether the second communication terminal has a Web Real-Time Communications ("WebRTC") client based on the received fourth message in response to receiving the fourth message;
the first gateway configured to facilitate the establishment of the connection without forwarding the at least one first ICE candidate identified by the first communication terminal upon a determination that the second communication terminal does not have a WebRTC client; and
the first gateway configured to send the fourth message to the first communication terminal and the first gateway configured to send a fifth message to identify the at least one first ICE candidate that the first communication terminal identified to the first gateway in the at least one third message such that the second communication terminal receives information about the at least one first ICE candidate upon a determination that the second communication terminal has a WebRTC client.

9. The system of claim 8 further comprising:
a second gateway communicatively connected to the second communication terminal;
the second gateway configured to receive the fifth message and forward information about the at least one first ICE candidate identified in the fifth message to the second communication terminal;
the second gateway configured to receive at least one sixth message from the second communication terminal after the second communication terminal sends the fourth message, each sixth message identifying at least one second ICE candidate for facilitating formation of the connection between the first and second communication terminals;

the second gateway configured to send a seventh message identifying the at least one second ICE candidate identified in each sixth message in response to receiving that sixth message such that the first gateway receives the seventh message after the first gateway receives the fourth message; and first gateway configured to send information about the at least one second ICE candidate identified in the seventh message to the first communication terminal in response to receiving the seventh message.

10. The system of claim 9 wherein the first communication terminal is a telephone device, a laptop computer, a tablet, a computer, or an internet appliance and the second communication terminal is a telephone device, a laptop computer, a tablet, a computer, or an internet appliance;

wherein the at least one sixth message is comprised of multiple sixth messages that each identify at least one second ICE candidate and;

wherein the at least one third message is comprised of multiple third messages that each identify at least one first ICE candidate.

11. The system of claim 8 wherein the first gateway is configured to save information about the at least one first ICE candidate identified via the at least one third message and the first gateway interworking to establish the connection, the connection being a media connection.

12. The system of claim 8 wherein the first message is comprised of an Offer in accordance with Session Description Protocol ("SDP") and the fourth message is comprised of an Answer in accordance with SDP.

13. The system of claim 12 wherein the second message is formed in accordance with Session Initiation Protocol ("SIP") and is an SIP INVITE message and wherein the fourth message is an SIP 200 OK message.

14. The method of claim 1 wherein the second communication terminal has a WebRTC client and wherein the connection established between the first and second communication terminals is a direct media connection.

15. The communication system of claim 8 wherein the first communication terminal and first gateway are within a first local area network and the second communication terminal is in a second local area network and wherein the system further comprising a second gateway in the second local area network communicatively connected to the second communication terminal, and wherein:

the second gateway is configured to receive the fifth message and forward information about the at least one first ICE candidate identified in the fifth message to the second communication terminal;

the second gateway is configured to receive at least one sixth message from the second communication terminal after the second communication terminal sends the fourth message, each sixth message identifying at least one second ICE candidate for facilitating formation of the connection between the first and second communication terminals;

the second gateway configured to send a seventh message identifying the at least one second ICE candidate identified in the at least one sixth message in response to receiving the sixth message such that the first gateway receives the seventh message after the first gateway receives the fourth message; and the first gateway configured to send information about the at least one second ICE candidate identified in the seventh message to the first communication terminal in response to receiving the seventh message.

16. The system of claim 15 wherein the first gateway is configured to save information about the at least one first ICE candidate identified via the at least one third message and the first gateway is configured to interwork to establish the connection, the connection being anchored in a Traversal Using Relays around Network Address Translators ("TURN") server.

17. A non-transitory computer readable medium having an application stored thereon, the application having instructions that define a method performed by a gateway when the application is executed by the gateway, the method comprising:

in response to receiving a first message from a first communication terminal for establishing a connection between the first communication terminal and a second communication terminal, the gateway modifying information included within the first message and sending a second message having the modified information toward the second communication terminal;

the gateway receiving a fourth message from the second terminal that answers the second message and accepts the establishing of the connection;

in response to receiving a fourth message from the second communication terminal that answers the second message and accepts the establishing of the connection, the gateway determining whether the second communication terminal has a Web Real-Time Communications ("WebRTC") client based on the received fourth message, wherein the fourth message is received after a third message from the first communication terminal is received by the gateway, the third message identifying at least one first Interactive Connectivity Establishment Protocol ("ICE") candidate for facilitating formation of the connection between the first and second communication terminals sought to be established by the first communication terminal sending the first message;

upon a determination that the second communication terminal does not have a WebRTC client, the gateway facilitating the establishment of the connection without forwarding the at least one first ICE candidate identified by the first communication terminal; and upon a determination that the second communication terminal has a WebRTC client, the gateway sending the fourth message to the first communication terminal and sending a fifth message to identify the at least one first ICE candidate that the first communication terminal identified to the gateway in the at least one third message such that the second communication terminal receives the identification of the at least one first ICE candidate.

18. The non-transitory computer readable medium of claim 17 wherein the method also comprises the gateway saving information about the at least one first ICE candidate identified via the at least one third message and the first gateway referencing information about the at least one first ICE candidate identified in the at least one third message for setting up the connection upon a determination that the second communication terminal does not have a WebRTC client.

19. The non-transitory computer readable medium of claim 17 wherein the first message is comprised of an Offer in accordance with Session Description Protocol ("SDP") and the fourth message is comprised of an Answer in accordance with SDP.

20. The non-transitory computer readable medium of claim 17 wherein the method further comprises the gateway sending information about at least one second ICE candidate identified in a sixth message to the first communication terminal in response to receiving the sixth message from the second communication terminal, the sixth message identifying at least one second ICE candidate, the sixth message received by the gateway after the fourth message.

* * * * *